United States Patent [19]

Brooks

[11] Patent Number: 4,866,919
[45] Date of Patent: Sep. 19, 1989

[54] AIR ASSISTED HARVESTING MEANS

[75] Inventor: Donald G. Brooks, Scarborough, Australia

[73] Assignee: Harvestaire Pty Ltd., Balcatta, Australia

[21] Appl. No.: 233,991

[22] Filed: Aug. 12, 1988

Related U.S. Application Data

[63] Continuation of Ser. No. 929,600, Nov. 12, 1986, abandoned.

[30] Foreign Application Priority Data

Nov. 11, 1985 [AU] Australia .................. PH3360

[51] Int. Cl.$^4$ ............................................. A01D 75/02
[52] U.S. Cl. ................... 56/12.9; 56/DIG. 8; 56/296; 56/14.6
[58] Field of Search ............ 56/12.8, 12.9, 13.1, 56/13.2, 14.3, 14.6, 30-32, 219, 220, 296, 312-314, 158, DIG. 8

[56] References Cited

U.S. PATENT DOCUMENTS

| | | |
|---|---|---|
| 859,602 | 7/1907 | Green . |
| 1,178,419 | 4/1916 | Shorten . |
| 1,794,658 | 3/1931 | Walsh . |
| 1,900,269 | 3/1933 | Altgelt et al. . |
| 2,502,810 | 4/1950 | Waters . |
| 2,670,586 | 3/1954 | Phillips . |
| 2,710,516 | 6/1955 | Kaesemeyer, Jr. . |
| 2,718,744 | 9/1955 | Phillips . |
| 2,734,331 | 2/1956 | Phillips . |
| 2,737,006 | 3/1956 | Klingler . |
| 2,780,046 | 2/1957 | Edwards ............... 56/DIG. 8 |
| 3,165,874 | 1/1965 | Osteen . |
| 3,193,995 | 7/1965 | Miller . |
| 3,581,483 | 6/1971 | Koll ...................... 56/DIG. 8 |
| 3,581,493 | 6/1971 | Kohl et al. ................ 327/56 |
| 4,303,373 | 12/1981 | Polhemus ................. 415/206 |
| 4,406,112 | 9/1983 | Brooks .................... 12.9/56 |

FOREIGN PATENT DOCUMENTS 624215 8/1961 Italy .

Primary Examiner—John Weiss
Attorney, Agent, or Firm—Kinney & Lange

[57] ABSTRACT

Air assisted harvesting means having a manifold extending transversely across the cutter bar platform of a harvester with a plurality of tubes depending therefrom, and nozzles on the tubes arranged to discharge air streams some of which at least partly overlie the air streams of others, so as to provide a deep rearwardly moving air curtain.

12 Claims, 3 Drawing Sheets

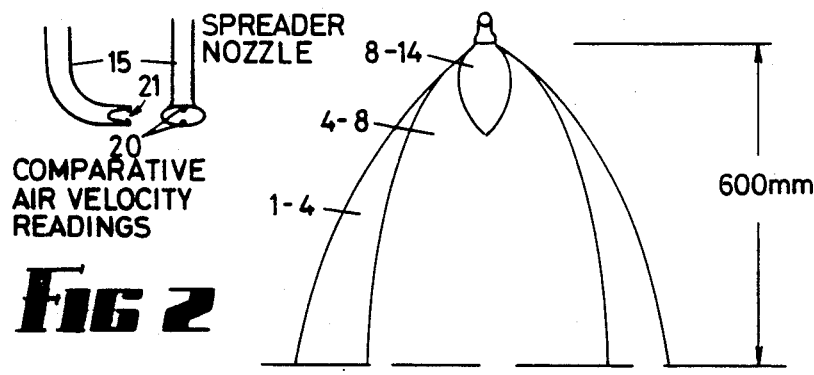
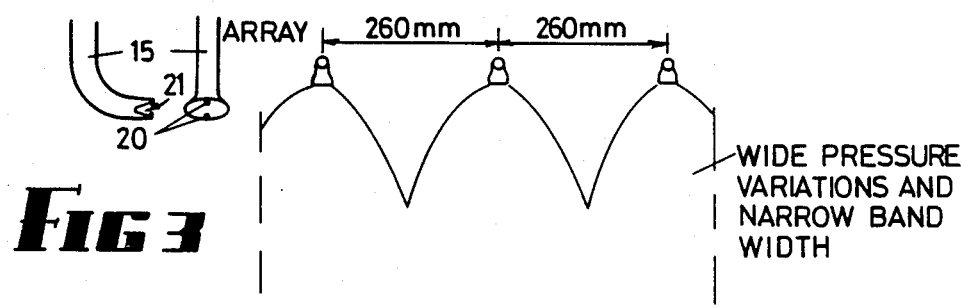
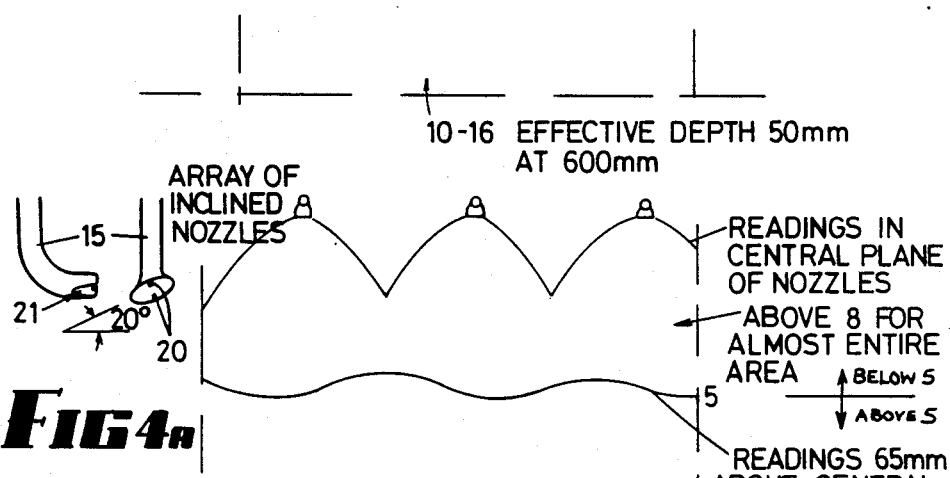
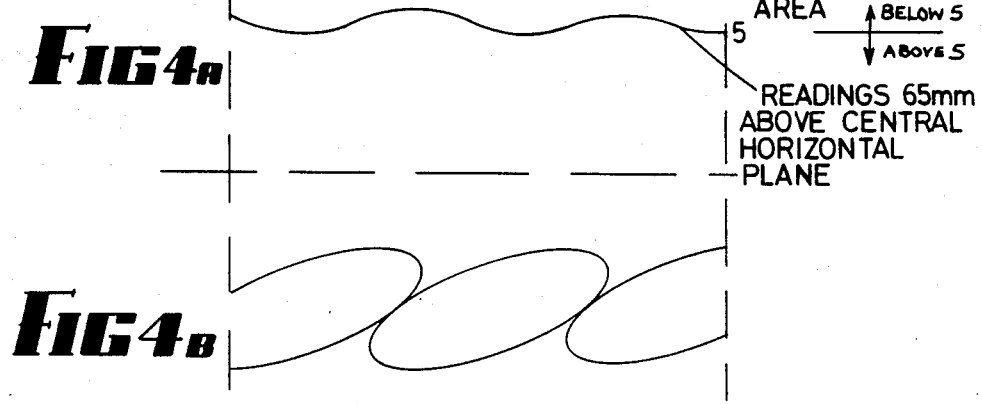

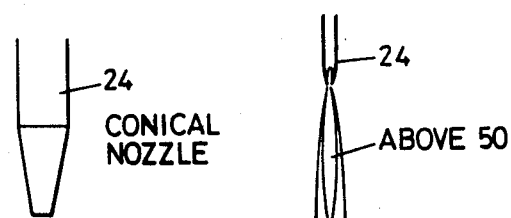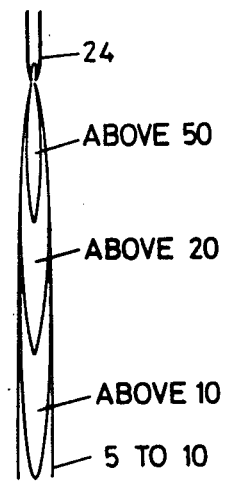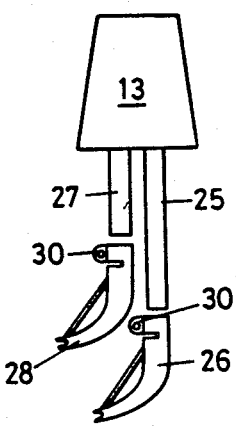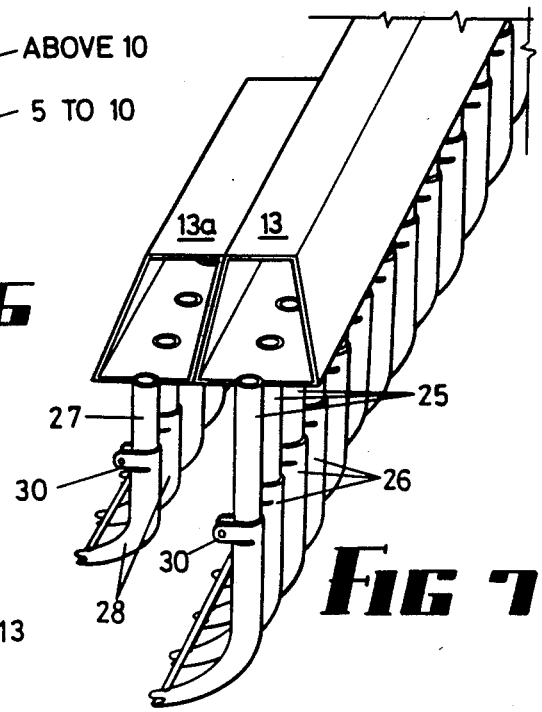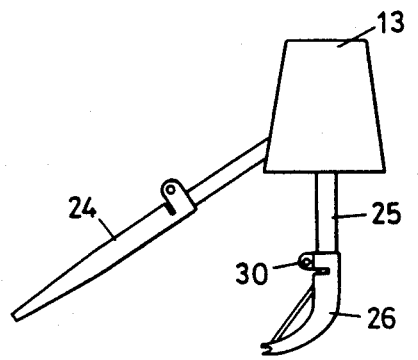

AIR ASSISTED HARVESTING MEANS

This is a continuation of application Ser. No. 929,600, filed Nov. 12, 1986 (now abandoned).

BACKGROUND OF THE INVENTION

1. Field of the Invention

This invention relates to an air attachment for a cutter platform of a harvester which may be used for harvesting grain and various other crops.

2. Description of the Prior Art

In the specification of the U.S. Pat. No. 4,406,112 lodged originally in the name of Donald George Brooks but assigned to the Applicant herein, there is a disclosure of a pressure air manifold arrangement which is effective in dispensing with a beater reel for the harvester platform, and, in lieu thereof, in blowing the heads of a crop across the platform after the heads have been severed by the knife blades of the platform. This arrangement has been outstandingly successful, but modifications have been needed when different types of crops are to be harvested. For example, if wheat, lentils, oats, lucerne and sorghum are to be harvested, the requirement is for only a narrow depth of air curtain to blow the heads across a platform and into the space which is controlled by the auger to transport the cut crop to a central location on the harvester from which they are in turn transported to a thresher drum or similar. If however barley, sunflowers, mung bean, or millet is to be harvested, it is desirable that the curtain of air should have greater depth to ensure that any seeds released during the cutting or transporting are blown across to be moved into the feeder house by the auger, and it is therefore quite difficult to get the required air movements effective for these two types of harvesting, with the configuration of air nozzle outlets illustrated in said U.S. Pat. No. 4,406,112.

Still further, lupins, some bearded cereal crops, soy beans, edible beans and other legume crops (e.g. cow peas), and rape seed, and any requirement for taking long straw or high and low crop heads growing together, require an even wider curtain of air. In particular, lupins are difficult to harvest efficiently because of the release of seeds by shattering, sometimes occurring merely with the heat of the sun, and often occurring when the lupins are subject to shock, when for example the stalks are cut by the knife blade of the harvester. The bushes which are released when the stalks of lupins are cut are so light and bunchy that they are difficult to transport transversely by the header platform auger.

Another problem which is frequently encountered is that the auger tends to build up a heavy crop at the feeder house location where it is required to be transported rearwardly in the machine to a thresher drum. This requires still further assistance particularly when a beater reel is dispensed with, as with air harvesting equipment.

Apart from the applicant's own Australian Patent No. 534,795 (U.S. Pat. No. 4,406,112), the most relevant prior art known to the Applicant comprises PHILLIPS U.S. Pat. No. 2,670,586, ALTGELT U.S. Pat. No. 1,900,269; MILLER U.S. Pat. No. 3,193,995; OSTEEN U.S. Pat. No. 3,165,874; and Italian Patent No. 624,215 COMOGLIO. In all this prior art, the air curtain depth was limited to a small dimension, which, according to experiments conducted by the Applicant herein, is unlikely to exceed 50 mm at a distance of 600 mm from the nozzles.

SUMMARY OF THE INVENTION

The main object of this invention is to provide improvements whereby an air harvester attachment may be readily adapted to handle various types of crops which may be required to be harvested, and in one embodiment of the invention, there is provided a transversely extending manifold having a plurality of tubes depending therefrom, and nozzles on the tubes arranged to discharge air streams some of which at least partly overlie the air streams of others, so as to provide a deep rearwardly moving air curtain.

More specifically, air harvesting means according to this invention consists of an air manifold mounting means for mounting the air manifold transversely at the front end of a harvester, a plurality of air distributor tubes depending from the manifold and in fluid flow communication therewith, rearwardly directed nozzles on the lower ends of respective said tubes, the shapes, locations and orientation of said nozzles being such that, in use, the air stream discharging from some of said nozzles at least partly overlie, in a vertical plane, the air stream discharging from others of said nozzles, thereby increasing air curtain depth but reducing overlap of air streams.

In some embodiments, non circular nozzles are inclined, while in other embodiments, the nozzles are clamped to the depending tubes (or directly to the manifold), so that they can, for example, be adjusted in alternate high and low elevation rows. They can also be raised and lowered with respect to the manifold, and the manifold may be carried on swinging arms the elevation of which can be adjusted. Further, the nozzles or tubes can be oriented inwardly towards the centre of the platform to assist the transverse movement of the heads.

In some instances, as for example when harvesting lupins, the crop may not be sufficiently influenced by the auger and other devices (for example retractable fingers, scoops, etc) to move quickly to the feeder house, and may build up in front of the auger preventing the crop feeding to the thresher drum. Thus, in another embodiment, there are provided ancillary nozzles for assisting such rearward movement of the harvester crop at the feeder house area of the platform. To be able to handle a variety of crops, ancillary nozzles may be spaced over all the length of cutting platform or any part thereof.

BRIEF SUMMARY OF THE DRAWINGS

Embodiments of the invention described hereunder in some detail with reference to and as illustrated in the accompanying drawings in which:

FIG. 2 shows in plan a velocity pattern of air when issuing from a spreader nozzle as illustrated in my earlier U.S. Pat. No. 534,795, FIG. 3 shows the improvement of that velocity pattern when there is an array of such nozzles as in U.S. Pat. No. 534,795, FIG. 4 illustrates the nozzles when inclined by about 20° to the horizontal, and illustrates diagramatically both velocity readings at a central plane of the nozzles and above or below the central plane by a distance of about 65 mm respectively, FIG. 4A being a plan view and FIG. 4B an elevation of the air streams 600 mm from the nozzles.

FIG. 5 shows the very narrow jet achieved by a conical nozzle, which has been found to be useful only in secondary locations, FIG. 6 shows an arrangement of two nozzles lying in the same vertical longitudinal plane and both attachable to tubes depending from the base of a manifold, FIG. 7 shows an arrangement similar to FIG. 6 but utilising a small manifold at the locality of the central part of the platform, and FIG. 8 is a view similar to FIG. 6 but showing the use of a conical nozzle for assisting the rearward movement of a nut crop.

FIGS. 2 and 3 illustrate the prior art of our said U.S. Pat. No. 4,406,112 (also Australian Patent No. 534,795).

DETAILED DESCRIPTION OF THE PREFERRED EMBODIMENTS

Figure 1:
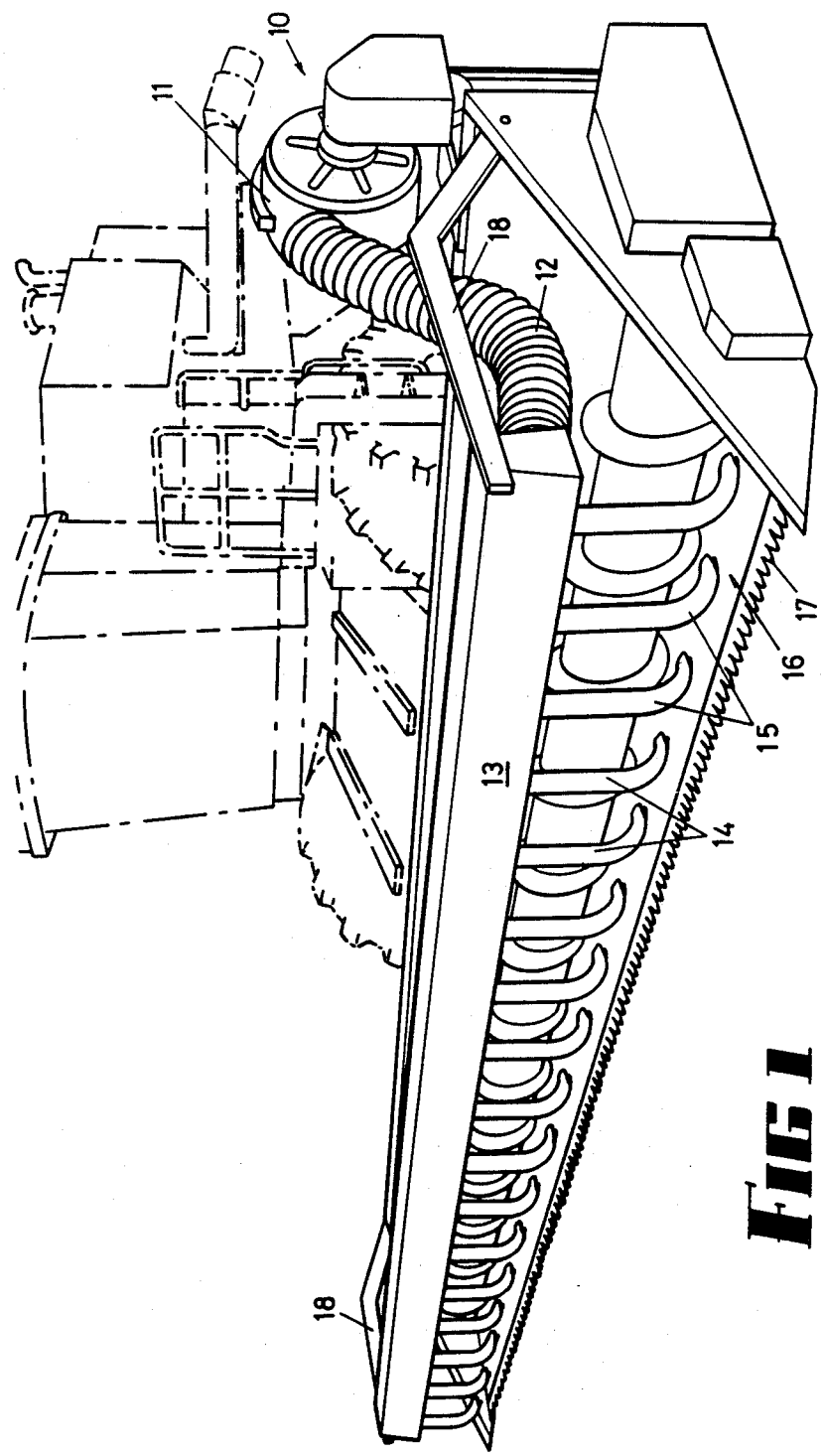
FIG. 1 illustrates a harvester which incorporates this invention.

In FIG. 1, a harvester 10 is provided with a blower 11 which delivers air at about 700 mm water pressure (28 inches, or 1 psi), through a delivery hose 12 to a manifold 13 from which depend a plurality of air distributor tubes 14, shown in FIG. 1 as a single row, each tube terminating at its lower end in a discharge nozzle 15, the nozzles being directed rearwardly to blow a curtain of air over a platform 16 of the harvester 10, so that a crop severed by the cutter bar assembly 17 is transported to the rear of the platform. Air manifold 13 is secured to harvester 10 by pivoted arms 18 which provide a simple height adjustment means for the manifold.

In FIGS. 2 through to 5, various patterns of velocity are indicated. The readings are numerical only and are not intended to identify knots or meters per second. However, for average purposes, any reading above 6 (about 40 meters per second) would indicate a useful velocity of air for transporting heads rearwardly. (The equivalent Reynolds number is about 65).

A nozzle outlet area of 600 mm$^2$ at 260 mm pitch is generally useful in that it allows use of relatively thin nozzles which minimise crop interference while allowing sufficient airflow.

A general minimum airflow requirement of 0.1 cubic meters/second per meter (1 cubic foot/second per foot) of platform length is necessary to effectively handle most crops. This corresponds to a minimum air velocity at the nozzle outlets of 40 meters per second, but in the illustrated embodiments the nozzle velocity is about 100 meters per second (as high as 300 meters/second in FIG. 5, corresponding to a Reynolds number of about 490).

Each nozzle 15 has a flattened end to provide an airstream of increased width but reduced depth, the end having a pair of central inwardly directed depressions or tabs 20 which deflect excessive air flow from the central part of the nozzle. In some embodiments of the invention, one or more of these tabs may be adjustable. If the nozzles are formed from metal, such adjustment can for example take place merely by bending. The sides of the nozzle include recesses 21 to increase the air stream width. The effective depth of the curtain of air is usually about 50 mm (at 200 mm distance), when an aligned array of nozzles is used as in FIG. 3.

The preferred arrangement is that shown in FIG. 4 wherein there is an array of flat sided nozzles which are greater in width than in depth, all inclined to the horizontal by about 20° (usually between 15° and 50°), so that the air streams at about 600 mm (8 inches) occupy an elevational shape as shown in FIG. 4B. This indicates the approximate locations of the reading 5 (about 35 meters per second), and corresponds to the lower graph line of FIG. 4A.

By utilising the inclined nozzles as illustrated in FIG. 4, the air flow can be effective as much as 65 mm above from the central plane. Thus the severed heads will be subject to an air flow having a band width of about 130 mm, the air velocity rising to a maximum at the central plane of the respective nozzles. This increase in air curtain depth is very valuable in assisting transport of crops which cannot otherwise be successfully transported to the rear of the platform.

Contrary to expectation, the use of conical nozzles is not effective in providing an air curtain, and as shown in FIG. 5 a conical nozzle 24 will give a very narrow stream of air wherein the velocity initially is very high but diminishes over a 600 mm distance.

If the arrangement of FIG. 6 is used, the longer depending tubes 25 which depend from the manifold can carry lower nozzles 26, and the shorter tubes 27 carry upper nozzles 28, and this is particularly suitable near the feeder house area of a platform wherein there is likely to be a reduction of feed speed, or a blockage or choking of the cut crop. An alternative arrangement is also shown in FIG. 7. In FIG. 7, a secondary manifold 13a is used to carry the forward short tubes 27, and only the longer tubes 28 depend from the main manifold 13. Clamps 30 secure the nozzles 26 and 28 to the tubes 25 and 27. This arrangement is also useful in lifting a tangled crop which has been depressed by wind and/or rain to lie close to the ground. In some embodiments, three rows of tubes are used.

Where blocking at the feeder house location is likely to be very serious such as in the harvesting of lupins, the arrangement in FIG. 8 may be used wherein the conical ended nozzle 24 can direct a very narrow stream of high velocity air as illustrated in FIG. 5, the energy of this being effective in moving the crop more quickly into the feeder house. Other elements bear similar designations to those of FIGS. 6 and 7.

Since the manifold 13 is carried on pivoted lifting arms 18, it can be lifted up so that the discharge nozzles are above the crop level, and discharge air downwardly onto and through the crop without necessarily contacting the crop heads directly. In such an instance, most of the shattered seeds will also be blown across the platform, and delivered to the auger controlled area along with the other remaining portion of the crop. The passage of air over the platform greatly facilitates the movement of such seeds.

When a very delicate crop such as lupins is to be handled, it is desirable that the nozzles do not encounter the crop, but if the arrangement of FIGS. 6 or 7 for example is used, the whole manifold can be tilted so that the nozzles are above the crop, and yet notwithstanding this, the air flow can be such as to traverse seeds across the platform and into the trough of the auger. This arrangement is also very suitable for sunflower seeds, and when used with a sunflower seed crop, the platform extension trays may be reduced considerably and seeds which become dislodged by the sunflower head upon it hitting the platform will also be moved across with the head to the auger.

Although the invention will be seen to be relatively simple, nevertheless it is effective in greatly increasing the range and scope of a harvester air manifold and nozzle configuration.

The claims defining the invention are as follows:

1. Air assisted harvesting means comprising an air manifold, mounting means for mounting the air manifold transversely at the front end of a harvester over a cutter bar assembly, a plurality of air distributor tubes depending from the manifold and in fluid flow communication therewith, rearwardly directed nozzles on the lower ends of respective said tubes, the transverse width of each nozzle being greater than its height, and the nozzles being inclined relative to the cutter bar assembly and transversely to the longitudinal axis of the harvester such that, in use, a portion of the pattern of the air stream discharge from each of said nozzles at least partly overlies, in a vertical plane, the pattern of discharge from at least one respective adjacent nozzle.

2. Air assisted harvesting means according to claim 1 wherein said mounting means comprises arms extending rearwardly of the manifold, and pivot means for pivotally mounting the arms to the harvester.

3. Air assisted harvesting means according to claim 1 wherein the width of each said nozzle is inclined to the horizontal by between 15° and 50°.

4. Air assisted harvesting means according to claim 3 wherein the width of each said nozzle is inclined to the horizontal by about 20°.

5. Air assisted harvesting means comprising an air manifold, mounting means for mounting the air manifold transversely at the front end of a harvester, at least two rows of air distribution tubes depending from the manifold and in fluid flow communication therewith, rearwardly directed nozzles on the lower ends of respective said tubes, the tubes of one of the rows being different length than the tubes of the other row such that, in use, a portion of the pattern of the airstream discharge from each of said nozzles at least partly overlies, in a vertical plane, the pattern of discharge from at least one respective adjacent nozzle.

6. Air assisted harvesting means according to claim 5 wherein a first row of depending tubes is longer than a second row of depending tubes, with the first row being in front of the second row.

7. Air assisted harvesting means according to claim 5 further comprising clamps on the nozzles clamping the nozzles to lower ends of respective said tubes.

8. Air assisted harvesting means according to claim 5 wherein a first row of depending tubes is longer than a second row of depending tubes, and wherein there are two manifolds side by side, the tubes of the first row depending from one manifold and the tubes of the second row depending from the other manifold.

9. Air assisted harvesting means according to claim 5 wherein some of the nozzles are greater in width than in height, and are parallel to the manifold, and further comprising other nozzles which are partly conical in shape.

10. Air assisted harvesting means according to claim 9 wherein at least some of the nozzles are transversely inclined to the longitudinal axis of the harvester by between 15° and 25°.

11. Air assisted harvesting means according to claim 5 wherein the tubes of one row depend from the manifold and alternate with the tubes of the other rows.

12. Air assisted harvesting means according to claim 9 wherein the nozzles which are partly conical in shape are located behind all of the other nozzles.

* * * * *

UNITED STATES PATENT AND TRADEMARK OFFICE
CERTIFICATE OF CORRECTION

PATENT NO. : 4,866,919

DATED : September 19, 1989

INVENTOR(S) : Donald G. Brooks

It is certified that error appears in the above-identified patent and that said Letters Patent is hereby corrected as shown below:

Column 5, lines 23-24, delete "to the horizontal by" and insert therefore --relative to the cutter bar assembly--.

Column 5, lines 26-27, delete "to the horizontal by" and insert therefore --relative to the cutter bar assembly--.

Signed and Sealed this

Twenty-first Day of August, 1990

Attest:

HARRY F. MANBECK, JR.

Attesting Officer

Commissioner of Patents and Trademarks